United States Patent [19]
Kammel

[11] Patent Number: 5,972,215
[45] Date of Patent: Oct. 26, 1999

[54] CONTINUOUS PARTICLE SEPARATION AND REMOVAL CLEANING SYSTEM

[76] Inventor: Refaat A. Kammel, 7165 Clinton Rd., Jackson, Mich. 49201

[21] Appl. No.: 08/922,656

[22] Filed: Sep. 3, 1997

[51] Int. Cl.$^6$ .............................. B01D 21/26; B03C 3/14
[52] U.S. Cl. .......................... 210/243; 210/295; 210/298; 210/304; 210/360.1; 210/512.1; 210/DIG. 5; 209/715; 209/717; 209/718; 55/413; 55/426; 55/459.1; 96/55; 96/61; 96/62; 96/64
[58] Field of Search ................................ 210/360.1, 787, 210/788, 512.1, 215, 304, 243, 298, DIG. 5; 209/715, 717, 718, 132; 55/DIG. 25, DIG. 37, 413, 426, 459.1; 96/15, 61, 55, 62, 63, 64

[56] References Cited

U.S. PATENT DOCUMENTS

| | | | |
|---|---|---|---|
| 2,711,226 | 7/1955 | Davis, Jr. ..................................... | 96/61 |
| 2,748,888 | 6/1956 | Hodson ........................................ | 96/61 |
| 3,815,337 | 6/1974 | Lenane ..................................... | 55/459.1 |
| 3,875,061 | 4/1975 | Palma ........................................ | 210/243 |
| 4,010,011 | 3/1977 | Reif ............................................ | 96/61 |
| 4,242,115 | 12/1980 | Harold et al. . | |
| 4,390,426 | 6/1983 | Vicard ..................................... | 210/243 |
| 4,491,460 | 1/1985 | Tokar . | |
| 4,581,050 | 4/1986 | Krantz . | |
| 4,868,948 | 9/1989 | Arnold . | |
| 4,869,737 | 9/1989 | Parenti . | |
| 4,969,328 | 11/1990 | Kammel . | |
| 5,097,665 | 3/1992 | Kammel . | |
| 5,121,601 | 6/1992 | Kammel . | |
| 5,352,256 | 10/1994 | Stead et al. . | |
| 5,364,458 | 11/1994 | Burnett et al. .............................. | 96/55 |
| 5,401,285 | 3/1995 | Gillingham et al. . | |
| 5,427,597 | 6/1995 | Osendorf . | |
| 5,545,241 | 8/1996 | Vanderauwera et al. . | |
| 5,653,879 | 8/1997 | Schroeder ................................ | 210/298 |

OTHER PUBLICATIONS

SAE Technical Paper Series, "A New Approach to Control the Regeneration Process In Wire Mesh Traps," R.A. Kammel (Paper No. 902236), Oct. 29–Nov. 1, 1990, 20 pages.
Teltech Literature Search Service, "Dust Filtration," Feb. 10, 1997, pp. 1–63, 65–73, 75.
Teltech Literature Search Service, "Air Filter Patents," Feb. 19, 1997, pp. 1–46.

*Primary Examiner*—David A. Reifsnyder
*Attorney, Agent, or Firm*—Harness, Dickey & Pierce, PLC

[57] ABSTRACT

A particle separator having a housing, a radially centered core, helical augers which force a fluid stream in a helical flow direction, and separator devices for the progressive separation of particles from a particulate contaminated fluid stream.

30 Claims, 9 Drawing Sheets

CONTINUOUS PARTICLE SEPARATION AND REMOVAL CLEANING SYSTEM

BACKGROUND OF THE INVENTION

1. Technical Field

This invention generally relates to a system for the removal of particles from a flow stream, and more particularly to a device for the continuous separation, collection, and removal of particulate matter from a gas or fluid flow stream.

2. Discussion

Several devices have been developed over the years for removing particulate matter, such as dust and contaminated particles, from a flow stream of gas or fluid. Such devices include: a cyclone type filter; gravity settling chambers; filtration bags; electrostatic precipitators; as well as other similar devices. Most, if not all of these devices, are deficient in certain performance characteristics. For example, some devices have limited filtration efficiency (such as in cyclones, settling chambers, or, electrostatic precipitators where the particles have very high or low electrical resistivity), while other devices have high capital and operating expenses and are complex (such as bag houses). Still other devices employ pleated filtration elements; however, once the elements are loaded with particles a complex system, commonly known as a reverse pulse jet or backwash, is needed to remove the particles from the filtration pleats and return the device to its initial filtering state.

The demand for the separation and removal of particulate matter from gaseous and fluid flow streams is always increasing and is promoted by Government environmental regulations and process demands. The regulations and demands are generally related to cleaner air and gas streams for industrial processes, engine air intake systems, and commercial and residential HVAC applications, as well as other similar applications. In most applications, there is a constant demand for higher collection efficiency at a lower capital expense and operating cost.

SUMMARY OF THE INVENTION

The present invention is a high-efficiency cleaning system which separates, collects, and removes particles when connected to a particulate-contaminated air or fluid source. The device separates, collects, and removes particle matter from the incoming flow or main stream. At a downstream end of the device, two flow channels are established. One is a dominant clean air flow channel wherein the flow is generally free of contaminants. A scavenging flow channel containing the particles separated from the main stream constitutes the second flow channel. The scavenging flow is generally about 3 to 10% of the total incoming flow. In air cleaner applications, the scavenging flow is usually discarded to the outside atmosphere. In other applications, such as an industrial process, the scavenging flow is further processed through recirculation to the incoming flow, and the solid particle matter is reclaimed for use in other processes or is discarded as a solid waste.

The present invention includes a number of features which individually and collectively contribute to the ability of the device to clean particulate matter from the gas or fluid flow stream. These features relate to: 1) reducing the turbulence in flow and subflow channels; 2) centrifugal separation; 3) axial acceleration; 4) electrostatic collection; 5) agglomeration of small-size particles; 6) progressive physical separation of collected particles; and 7) the manner in which fluid flow is distributed in various zones in the device. The manner in which these physical principals are relied upon and utilized is designed to overcome the deficient characteristics inherent in some prior systems but efficient when used in other systems. Generally the degree of reliance to achieve the desired results are in the following order of: 1) centrifugal separation; 2) elastostatic collection; 3) reduction of turbulence; and 4) axial acceleration. For example, if the electrical resistively of the particles does not lend itself to adequate electrostatic collection, more emphasis is placed on centrifugal separation, axial separation and reduction of turbulence. By utilizing the above strategy, a majority of the performance deficiencies of exiting devices can be overcome.

The foregoing features, advantages, and benefits of the invention, along with additional ones, will become apparent to one skilled in the art upon reading the ensuing description and appended claims. The description should be considered in conjunction with the accompanying drawings which disclose a preferred embodiment of the invention according to the best mode presently contemplated for carrying out the invention.

BRIEF DESCRIPTION OF THE DRAWINGS

Like reference letters and numeric designations are assigned to common structures or components throughout the several drawings which include.

DETAILED DESCRIPTION OF THE PREFERRED EMBODIMENT

The following description of the preferred embodiment is merely exemplary in nature and is in no way intended to limit the invention or its application or uses. The principles of the present invention may be applied to, but are not limited to, air filtration systems used for internal combustion engines used in mining, construction, or military tanks, commercial and residential heating, ventilation and air-conditioning systems (HVAC), industrial process exhaust stacks such as cement kilns and incinerators, diesel engine exhaust systems, or fugitive dust environments such as in foundries, road sweepers, or other industrial processes. The device can be used for fluid applications such as the removal of particle contaminants from oils. Where flow stream temperatures are high, the materials of the device can be upgraded from thermoplastics, which are lightweight and cost effective in most applications, to stainless steel or equivalent type materials which have improved thermal resistant properties.

Figure 1:
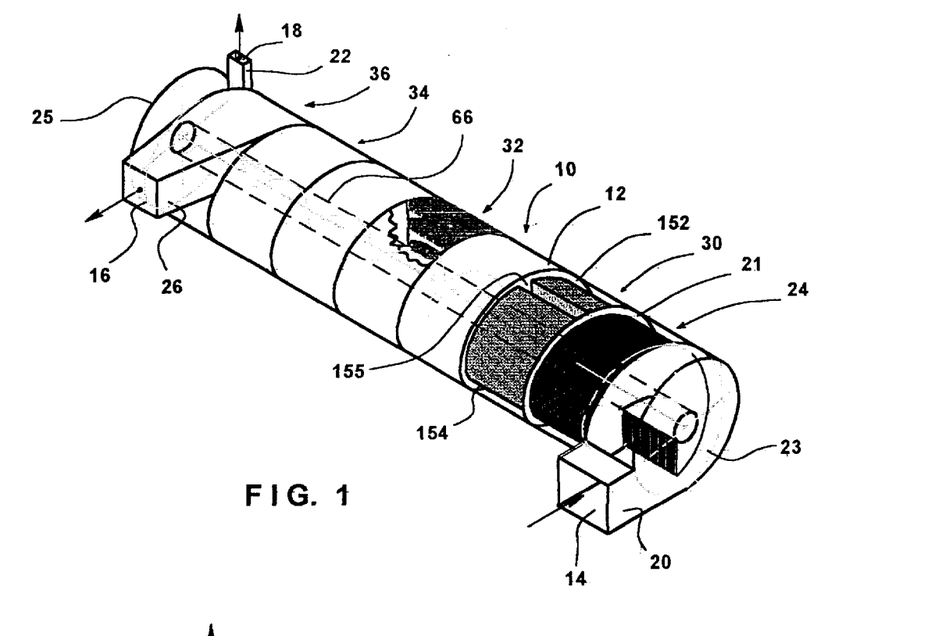
FIG. 1 shows a pictorial view of the continuous air cleaner illustrating internal air flow according to the principles of the present invention.
Figure 2:
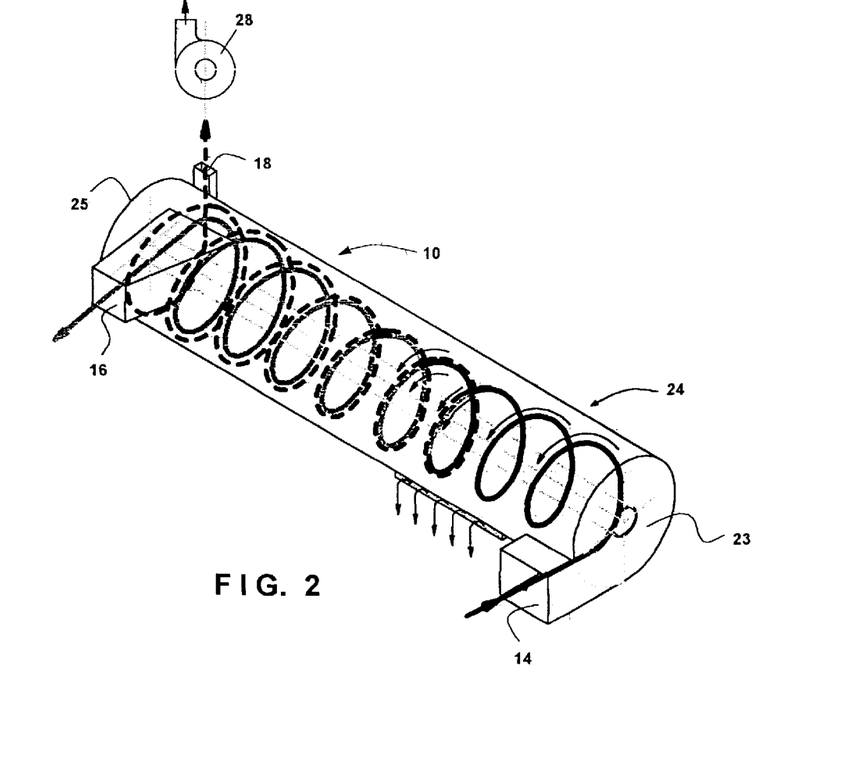
FIG. 2 shows a pictorial schematic view of the continuous air cleaner illustrating the evolution and separation of dirty and clean air flow paths.
Figure 3:
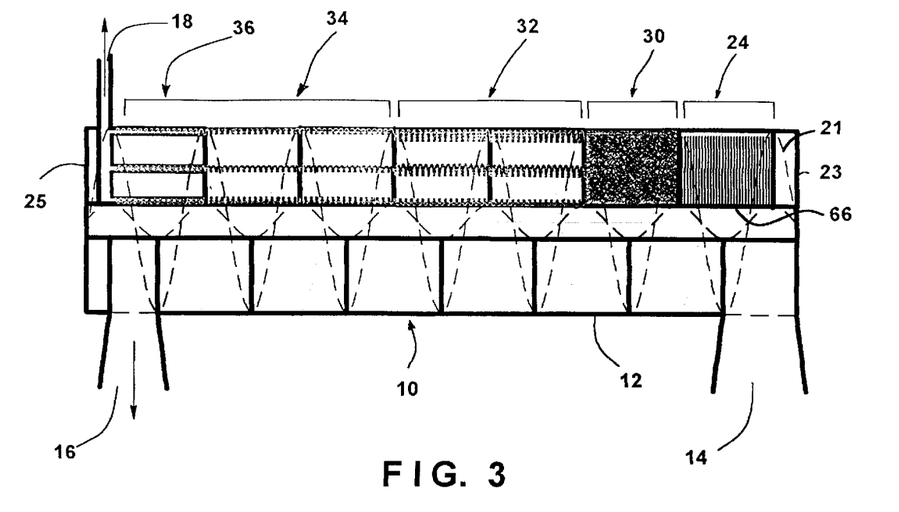
FIG. 3 is a longitudinal cross-sectional view of the present invention illustrating the various stages of the air cleaner.

Referring now to FIGS. 1, 2, and 3, there is shown a preferred embodiment of the continuous air cleaner of the present invention, generally designated 10. The continuous air cleaner 10 includes a generally cylindrical housing 12 for housing the particle agglomeration, separation, collection, and removal mechanisms described below. The housing 12 has an air inlet 14 which connects to the particle contaminated air source, a clean air outlet 16, and a dirty air outlet 18, and is preferably constructed of an engineered plastic or other high abrasive-resistant material. Attached to housing 12 is an intake duct 20. The intake duct 20 converges and ramps the incoming air flow into a generally helical flow pattern which is directed through cleaner 10 by helical augers 21 from an upstream end 23 to the downstream end 25. Duct 20 may be perpendicular to the centerline of the device (as shown) or axial along the centerline of the device (not shown). A dirty air duct 22 at the downstream end 25 carries a small portion, typically 3–10%, of the total air which contains the particles removed from the airstream entering at air inlet 14. The flow through duct 22 is also referred to as scavenger flow. Dirty air duct 22 diverges and ramps the airstream exiting outlet 18 from a helical flow to a more linear duct flow. A clean air duct 26 is also attached to housing 12 at the downstream end 25 and returns clean air to the desired environment.

The principles of operation of the continuous air cleaner 10 are shown best in the schematic illustration at FIG. 2. Particulate-contaminated air is introduced through inlet 14. In applications where dust loading is considered high, it is preferable to separate and remove a majority of the coarse particles in the first stage of air cleaner 10. This first stage is known as a precleaner 24. The remaining air will be processed through the remaining mechanisms as will be described. At the downstream end 25 of cleaner 10, scavenger flow exits outlet 18 and carries with it the separated particles. In some situations a scavenger blower 28 may be necessary to achieve and maintain the desired scavenger flow through outlet 18. Scavenger flow blower 28 can also be used to recirculate the scavenger flow to the air inlet 14 for further cleaning. In other applications, such as where the flow of air is steady and the static pressure is close to atmospheric pressure, a scavenger blower 28 is typically not necessary.

As shown best in FIG. 3, the particle separation mechanisms of the preferred embodiment of air cleaner 10 include: precleaner 24; agglomerator 30; high-efficiency particle separator 32; medium-efficiency particle separator 34; and final particle separator 36. Each of the stated structures can be used collectively or in combinations that are tailored to the characteristics, particle size distribution, and concentration of the particles in the environment. For example, if the air entering air inlet 14 has a high level of coarse particles (e.g. over 10 microns) and if dust concentration is high, a precleaner 24 is typically utilized. If the air entering air inlet 14 contains a high concentration of small particles (e.g. less than 5 microns), it is desirable to utilize an agglomerator 30. The degree to which the high-efficiency and medium-efficiency particle separators, 32 and 34 respectively, are utilized depends upon the level of cleanliness required for the air flow leaving clean air outlet 16.

Figure 4:
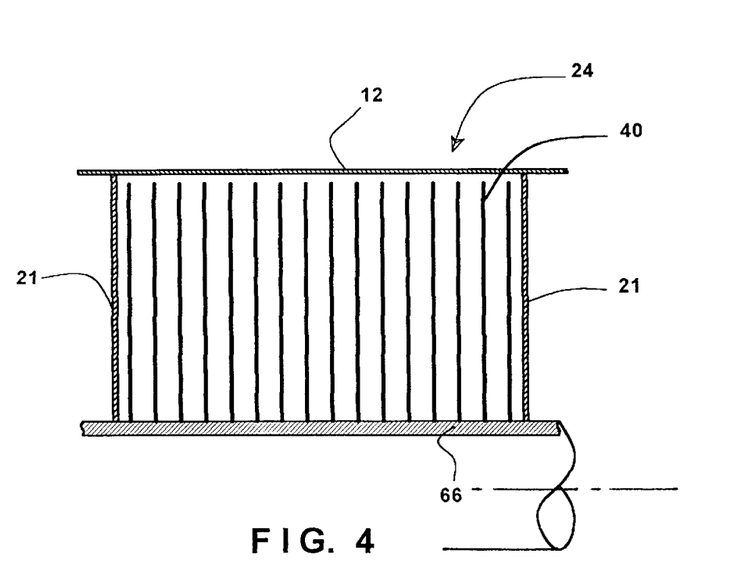
FIG. 4 is a detailed sectional view of the precleaner configuration as taught by the present invention.
Figure 5:
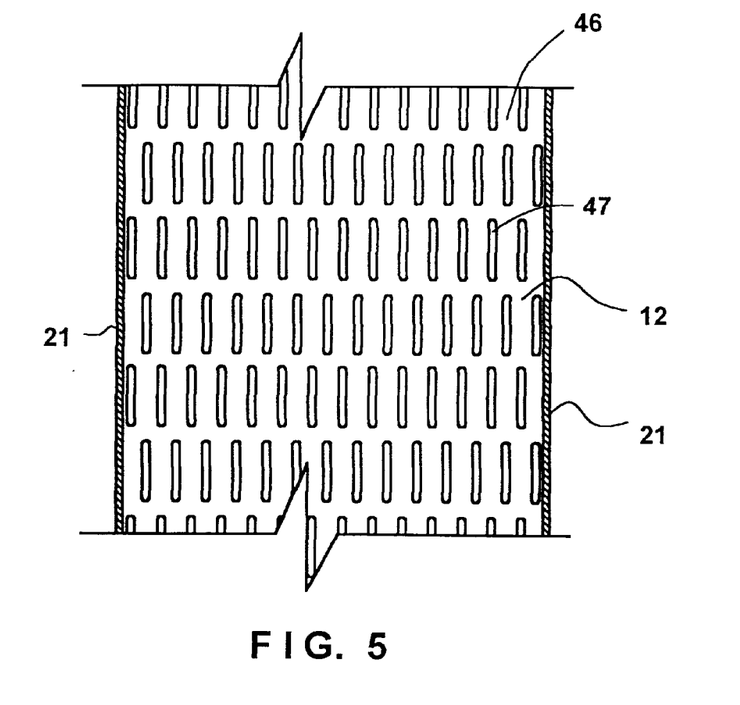
FIG. 5 is a partial detailed view of the precleaner perforated shell of the preferred embodiment.
Figure 6:
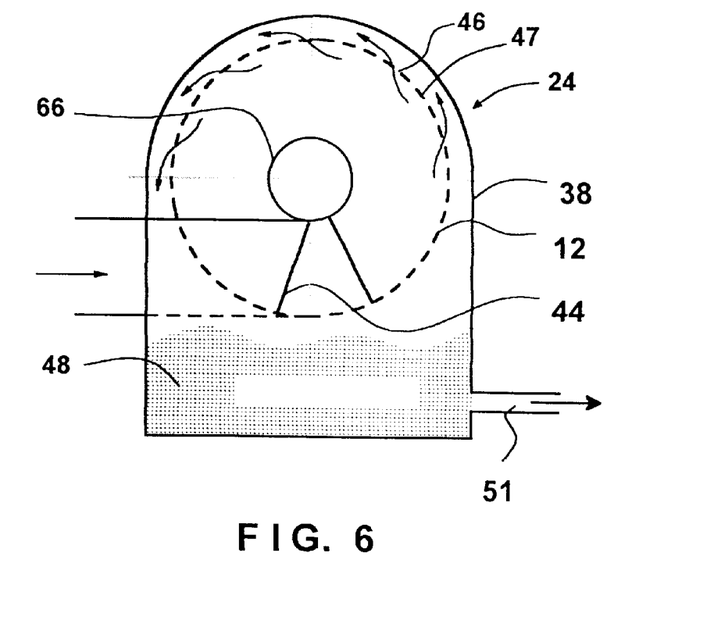
FIG. 6 is a schematic side view of the precleaner made in accordance with the teachings of the present invention.

FIGS. 4, 5, and 6 show a preferred embodiment of the configuration of precleaner 24. This configuration expedites the process of separating coarse particles to an outside shell 38 surrounding housing 12 by relying upon centrifugal forces. A most simplified embodiment is an empty cyclonic configuration. Alternately, as shown, a set of augers 40 may be introduced for the purpose of reducing turbulence, and consequently improving the particle separation action of precleaner 24. A typical precleaner will generally occupy approximately one full turn (360°) within housing 12. However, the size of precleaner 24 utilized in any particular application depends upon the cost/benefit trade off and the space available. Precleaner 24 can be extended to two turns (720°) of cyclonic rotation or more where space is available. The selection of augers 40 and the spacing between each auger depends on the desired degree of particle collection, radial separation, and the associated pressure drop. The augers 40 may be electrically charged, thereby enhancing the collection of smaller size particles by precleaner 24. Particles collected on augers 40 tend to allow precleaner 24 to function to some extent as an agglomerator. Fine particles collected on the surfaces of the augers 40 coagulate and form dendrites. Once the dendrites reach a certain threshold size, the aerodynamic drag forces of the fluid flowing over the dendrites cause the dendrites to migrate and be swept in the direction of the flow stream. At the helical end 44 of the augers 40, the dendrites are released into the flow stream. Released dendrites are usually characterized by a large-size relative to the incoming particles which make them up. The released dendrites will be captured in a later stage such as the high efficiency particle separator 32. Coarse particles and some fine particles in the incoming flow stream are separated by centrifugal forces toward the outside shell 38 and penetrate a perforated shell portion 46 of housing 12 as shown in FIGS. 5 and 6. Coarse particles and some fine particles which penetrate the apertures 47 in perforated shell portion 46 enter a settling chamber 48 within outside shell 38 and experience a sudden drop in velocity. The drop in velocity enhances the tendency of the particles to settle to the bottom of the chamber 48. Remaining suspended particles eventually will settle down to the bottom of the chamber. Settling chamber 48 of the present invention is typically designed to be completely sealed which causes a small air flow to naturally be maintained in the flow direction. This small air flow will carry heavy dust loading at the upstream side of precleaner 24 and reenter it back to the downstream side of precleaner 24. The reentry is due to the pressure drop experienced along precleaner 24 within perforated shell portion 46 being greater than the pressure drop experienced along the precleaner 24 within the settling chamber 48. Under some conditions, such as if baffles (not shown) are added within chamber 48, little or no flow takes place in the settling chamber 48 and most of the particles will settle to the bottom of the settling chamber 48 where it can periodically be removed. It is desirable, however, to allow 1–3% of the air flow out of precleaner 24 to act as a continuous particle removal flow from the settling chamber 48 and exit the settling chamber outlet 51 (shown in FIG. 6). The particle removal flow exiting outlet 51 encourages the flow of particles from cleaner 10 through the perforated shell 46 to be in the same direction as the flow stream thereby enhancing the efficiency of precleaner 24. A typical precleaner used with the present invention will have a particle removal efficiency in the 70% to 90% range depending upon the particle size distribution and the exact precleaner configuration.

It should be noted that precleaner 24 can be utilized without an outside shell 38. When so constructed, the particles passing through apertures 47 of perforated shell portion 46 freely exit into the surrounding environment. Depending upon the specific application of cleaner 10 either a settling chamber 48 or an open type system can be used.

Figure 7:
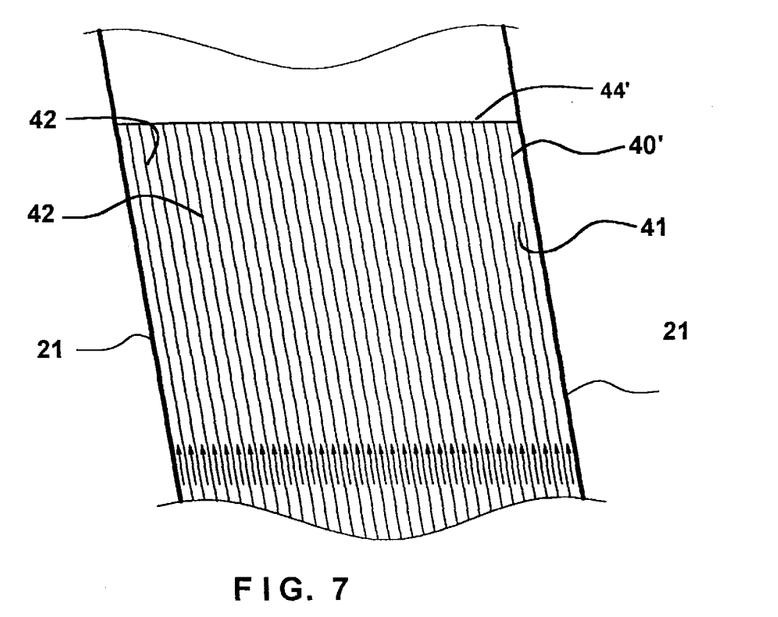
FIG. 7 is a partial detailed view of the unfolded precleaner augers of an alternate embodiment of the present invention.

FIG. 7, illustrates an unfolded view of a second preferred embodiment of the augers 40', herein referred to as "straight augers". Air flows through the straight cyclonic gap 41 between any two adjacent augers 40'. This embodiment is effective in centrifugal separation of coarse particles, but may not be as effective in the collection and agglomeration of small-size particles on the surfaces 42 of augers 40'. Helical end 44' (previously discussed as end 44 in the prior embodiment) is shown best in FIG. 7.

Figure 8:
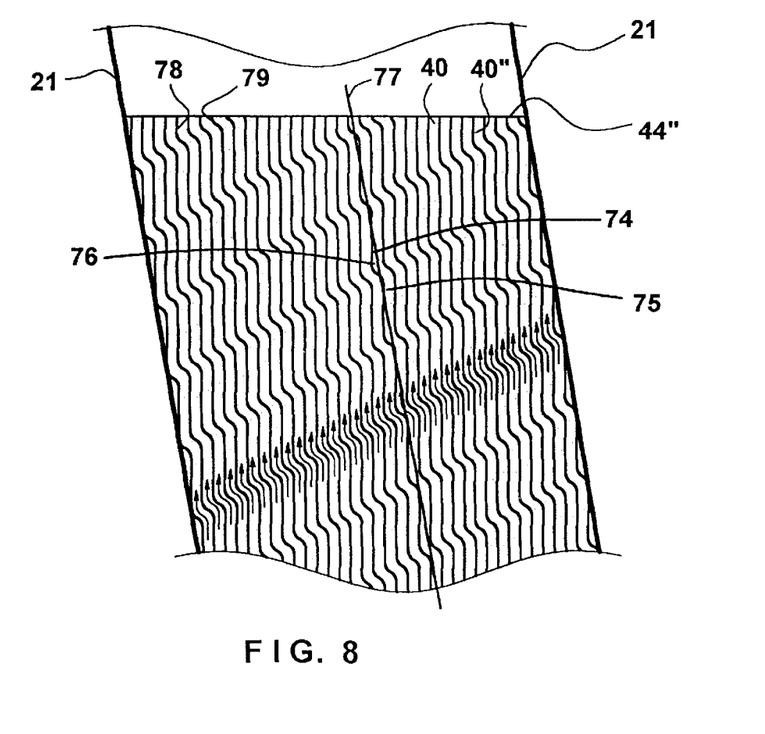
FIG. 8 is a partial detailed view of the unfolded precleaner augers of a further alternate embodiment of the present invention.

FIG. 8 illustrates an unfolded view of a third preferred embodiment of the augers 40", herein referred to as "wavering augers". Air flows through the wavery cyclonic gap 43 between any two adjacent augers 40". Air flow within wavering augers 40" may be divided into three zones: 1) straight flow along portion 74; 2) wavery flow to the right along portion 75; and 3) wavery flow to the left along portion 76. The portions 74, 75, and 76 are most easily seen relative to reference line 77.

Any combination of zones is acceptable and is dictated by design requirements. Primarily, the degree of wavering or rate of change of flow velocity with respect to time should not create undesirable flow separation or an unacceptable level of turbulence within augers 40". When flow passes through the "right wavery shape" portion 75, high axial acceleration is created in addition to the radical centrifugal acceleration. This axial acceleration, in addition to electrostatic charging of the augers 40" (like that of 40), will enhance small-size particle collection in close proximity to the surfaces 78 of augers 40" surface. Also, when air passes through the "left wavery shape" portion 76, the same phenomenon applies to particle collection on the opposite surfaces 79 of augers 40". This double collection effect provides for very high particle collection on both sides of the flow stream through wavering augers 40". Consequently, the third embodiment is effective in both centrifugal separation as well as collection and agglomeration of small-size particles. However, the pressure drop along wavering augers 40" will be slightly higher than the pressure drop along straight augers 40' previously shown and described.

Figure 9:
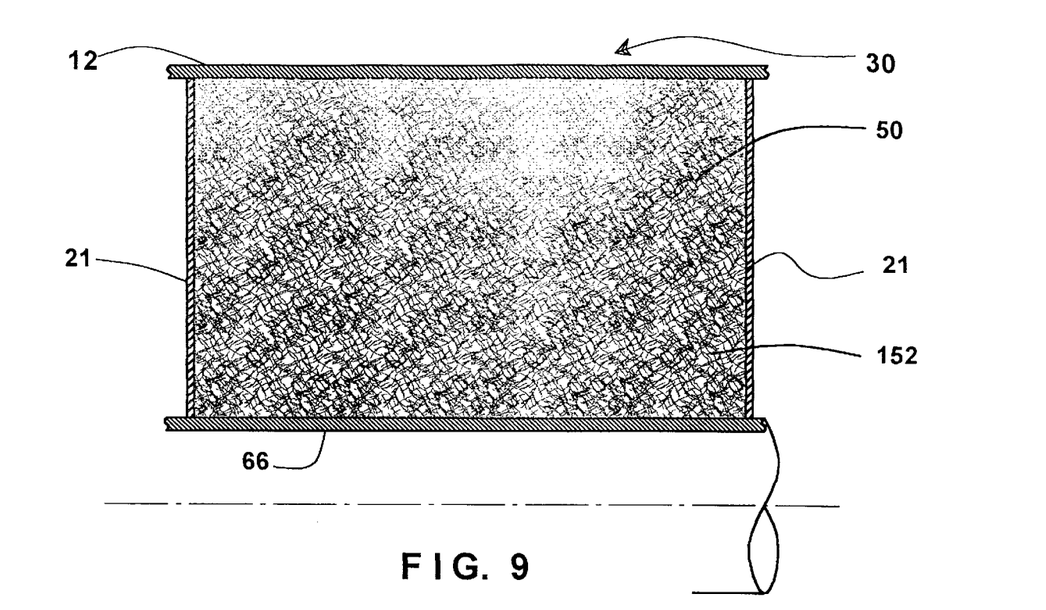
FIG. 9 is a detailed sectional view of a wire mesh agglomerator as taught by the present invention.

With reference to FIGS. 1 and 9, there is shown a preferred embodiment of particle agglomerator 30. In its simplest form, agglomerator 30 is composed of fine strands of sintered wire mesh 50 packed in the cyclonic space. To maximize the agglomeration efficiency and lower the pressure drop across agglomerator 30, wire mesh 50 is divided into two packs 152 and 154 having low-packing density. Packs 152 and 154 are electrically isolated by a gap 155 and 156 (not shown). Pack 152 is positively charged while pack 154 is negatively charged by a high voltage applied to each pack. The combination of the high voltage and the fine strands of wire mesh 50 enhance the diffusion and interception modes of particle collection within agglomerator 30. Fine particles collected on wire mesh 50 form dendrites that reenter the main flow stream and are later released in much the same manner as in the augers 40 of the precleaner 24. The agglomerator 30 is designed to release all agglomerated particles (dendrites) without excessive build-up. It should be noted that the agglomerator of the preferred embodiment will build up particles up to a certain level before it reaches stabilization.

Figure 10:
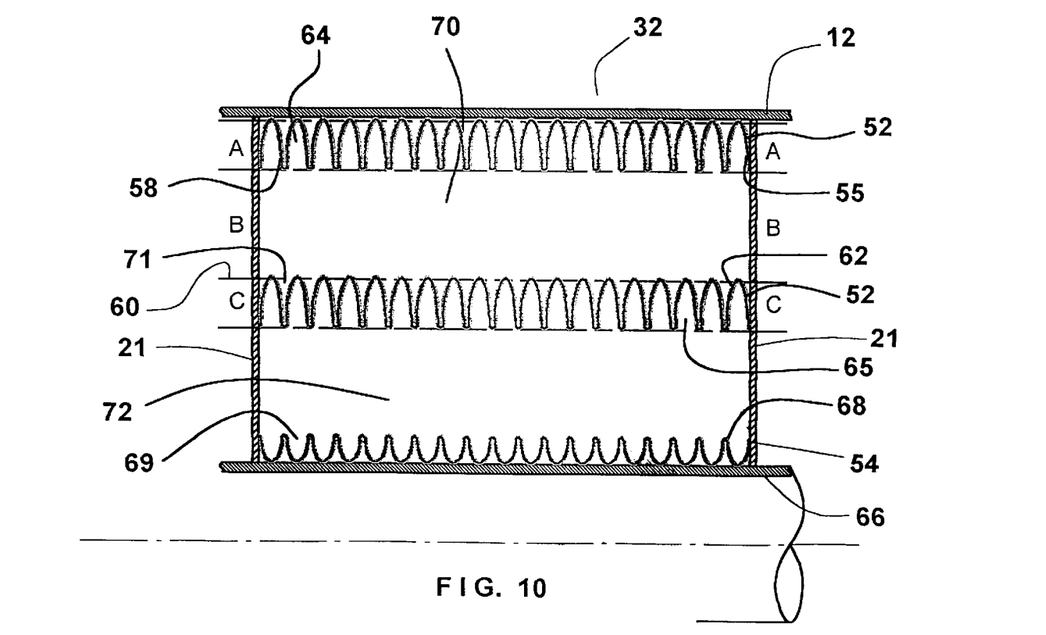
FIG. 10 shows a detailed sectional view of the high-efficiency particle separator of the preferred embodiment.

FIG. 10 shows a preferred embodiment of high-efficiency particle separator 32 which consists of several thin-walled sheet metal substrates 52, 53, and 54 formed in a comb-like manner, referred to as louvers with teeth. The metal substrates 52, 53, and 54 are coated with electrical insulating material 55 having a relatively high dielectric constant (preferably over 3.0). The comb like shape is biased to favor more particle entrapment efficiency in region A—A versus region C—C. This biasing is accomplished by having a greater surface area opening at the interface plane 56 on the radially inward facing side 58 of metal substrate 52, while the surface area opening at the interface plane 60 on the radially outward facing side 62 of substrate 53 is less. It should be noted that particles separated through centrifugal action are primarily collected within the teeth spacing flow area 64 facing the radially inward side 58.

Separator 32 may contain any number of louvers with teeth. In most applications the number of louvers with teeth is usually between three and five. The preferred embodiment shown in FIG. 10 has three, although more than five could be used. The metal substrate 54, adjacent to the radially centered core 66 of cleaner 10, typically has shorter teeth 68 than those positioned radially outward from the core 66. The presence of a central louver with teeth (metal substrate 53) splits the air flow channel passing through separator 32. The flow contained between any two adjacent louvers (i.e. substrates 52 and 53, or 53 and 54) is considered as a subflow. Each louver is connected to a high-voltage power supply (not shown). By altering the polarity of the high-voltage supply for each adjacent louver, an electrostatic field is created between adjacent louvers. In the present embodiment substrates 52 and 54 are positively charged while substrate 53 is negatively charged. The high dielectric constant of the electrical insulating material 55 increases the electrostatic field strength at the louver surfaces thereby enhancing collection performance.

The subflows of air move in the cyclonic space bounded by any two adjacent louvers in what is called a subflow channel 70 and 72. The flow of air in subflow channel 70 may be divided into three distinct regions indicated as regions A—A, B—B, and C—C in FIG. 10. The radial migration of particles, to achieve a desired cleanliness, corresponds to the radial spacing of region B—B, which is typically between 0.5 and 2" in the preferred embodiment. Since larger boundary surface areas are created in regions A—A and C—C, as previously discussed, the average flow velocity between any two adjacent teeth of substrate 52 or 53 (e.g. teeth spacing flow area 64 is substrate 52) is less than the average flow velocity in region B—B. Greater tooth depth and/or narrower spacing between adjacent teeth increases the boundary surface areas, and consequently creates a lower average flow velocity in flow area 64, thereby increasing the average flow velocity in region B—B of channel 70. The velocity in flow area 64 is typically 20–25% of the velocity in region B—B. Such a characteristic is very desirable for two reasons. First, higher average flow velocity in region B—B results in higher centrifugal forces on the particles and thus enhanced separation. Second, lower average flow velocity in region A—A and C—C significantly reduces turbulence, allowing for an increase in laminar flow. With increased laminar flow the particle collection on the teeth surfaces in region A—A and C—C is greatly enhanced.

The presence of the louvers with teeth creates two scenarios for particle collection and entrapment. These two scenarios are related to the two different regions, region A—A and region C—C. Particles in flow area 71 of region C—C are usually small-size particles and are collected primarily through the electrostatic effect created by the opposite polarity of the adjacent louver as previously described. The small particles agglomerate and form dendrites that will migrate in the direction of the downstream flow. Larger sized particles usually have higher migration velocity in the radial direction and are not typically collected in region C—C. Therefore, it is desirable to have teeth of lower height and wider spacing in the region C—C than in region A—A (flow area 71 versus flow area 64). A reduction in turbulence within region C—C is desirable such that the particles which have collected on the surface of metal substrate 53 remain collected and are not allowed to reenter region B—B. As the majority of the particles migrate in the outward radial direction towards region A—A, the particles cross the interface plane 56 separating region A—A and B—B. Particles in region A—A are either collected on the surface of metal substrate 52 or continue to be suspended in the flow stream within the teeth spacing flow area 64. As such, particles within region A—A are totally trapped and remain confined within the region. Although the centrifugal action is reduced in region A—A due to the lower flow velocity compared to region B—B, particle migration in the radial direction still continues.

Particle collection on the surface of metal substrate 53 is enhanced by the electrostatic effect, and the increased laminar flow condition as previously discussed. Particles crossing the interface plane 56 between regions A—A and B—B will not return to region B—B due to the effect of the forgoing physical forces. It may be concluded that particle entrapment efficiency in region A—A is close to 100%, from a practical point of view.

It should be noted that intermediate louvers, such as substrate 53, have flow areas 71 adjacent to region B—B of subflow channel 70, and teeth spacing flow area 65 within subflow channel 72. Flow areas 71 and 65 are biased due to their function. Flow area 65 has the same function within channel 72 as flow area 64 has within channel 70 and needs to have larger size; while flow area 71 has the same function within channel 70 as flow area 69 has within channel 72 and has a smaller size.

It should be noted that particle migration velocity in the radial direction is critically dependent on particle size. Small-size particles have a low radial migration velocity, on the other hand, large-size particles have a relatively high radial migration velocity. From a practical point of view, particle separation down to the 0.5 to 1 μm range in size can be accomplished through centrifugal action in the subflow channels such as 70 and 72. Should smaller-size particles be targeted for collection, the length of the flow path will be increased, and the radial spacing of subflow channels 70 and 72 will decrease.

The strategy employed in cleaner 10 of the preferred embodiment is based on separating and collecting particles having a size of 2 μm or less in precleaner 24 and the agglomerator 30, the particles being agglomerated and released as large dendrites to the high-efficiency particle separator. Small-size particles that have not been agglomerated are likely to remain in region B—B as they leave separator 32.

Figure 12:
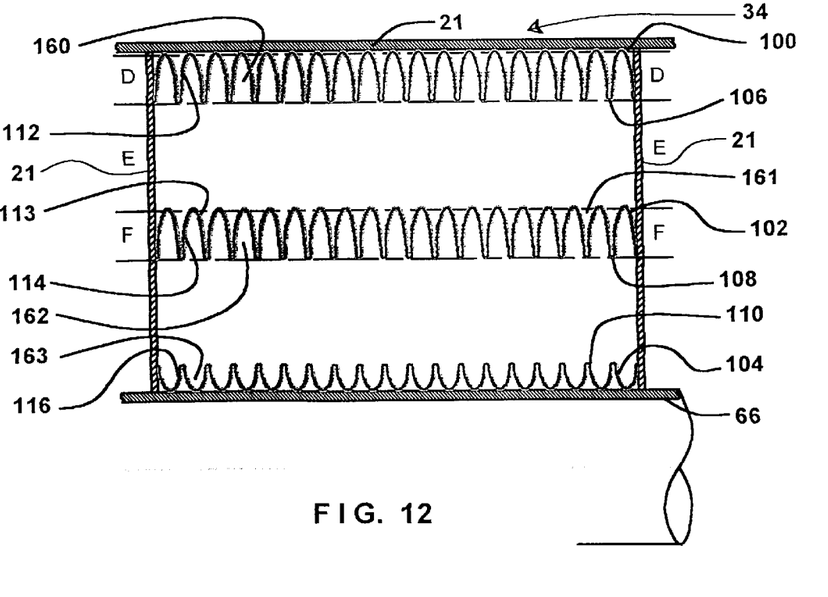
FIG. 12 shows a detailed sectional view of the medium-efficiency particle separator of the preferred embodiment.

FIG. 12 shows medium-efficiency particle separator 34 including thin-walled sheet metal substrates 100, 102, and 104, having comb-like shapes with teeth 106, 108, and 110, similar in construction to those of separator 32 (shown in FIG. 10), except that the teeth are typically shorter then those used in separator 32. In the preferred embodiment, the teeth 106, 108, and 110 have an average height of about 0.30". Medium-efficiency particle separator 34 follows the high-efficiency particle separator 32. Separator 34 is engaged when sufficient particle separation in region B—B (shown in FIG. 10 and described above) has been achieved by separator 32.

High-efficiency separator 32 and medium-efficience separator 34 are connected such that regions A—A, B—B, and C—C in separator 32 become regions D—D, E—E, and F—F in separator 34. It should be noted that while separators 32 and 34 are described as being separate mechanisms in the preferred embodiment, it is within the teachings of the present invention to provide a single separator progressively incorporating the louvers with teeth as taught in separators 32 and 34.

As particles in region E—E of separator 34 continue to radially migrate due to centrifugal action, the fluid layers in region D—D that are adjacent to region E—E become progressively cleaner to the same degree as region E—E. Therefore, it is desirable to reduce the height of teeth 106, 108, and 110. This reduction in height serves three purposes. First, the pressure drop along separator 34 is reduced as a result of a reduction in the viscous boundary areas. Secondly, by increasing the size of region E—E, the average velocity in region D—D decreases, thus further enhancing particle collection and agglomeration. Thirdly, the scavenger flow in the teeth spacing flow areas 160, 161, 162, and 163 is reduced, thus reducing the scavenger flow as a percentage of total incoming flow.

It should be noted that both the high-efficiency separator 32 and medium-efficiency particle separator 34 separate particles from the flowstream through both centrifugal and electrostatic forces. These particles are collected and trapped on surface 112 of teeth 106, surfaces 113 and 114 of teeth 108, and surface 116 of teeth 110 while the remaining separated particles are suspended in flow areas 160, 161, 162, and 163. The fluid flow contained in region D—D constitutes the previously discussed scavenger flow. As such, all particles that are in region D—D, whether they are collected on the surface 112 or suspended in flow area 160, are removed with almost 100% removal efficiency. However, it should be noted that it is desirable to have more particles collected on surfaces 112, 113, 114, and 116, particularly small-size particles, because collected and agglomerated particles can be separated as solid waste through further processing which is desirable in selected applications.

Figure 13:
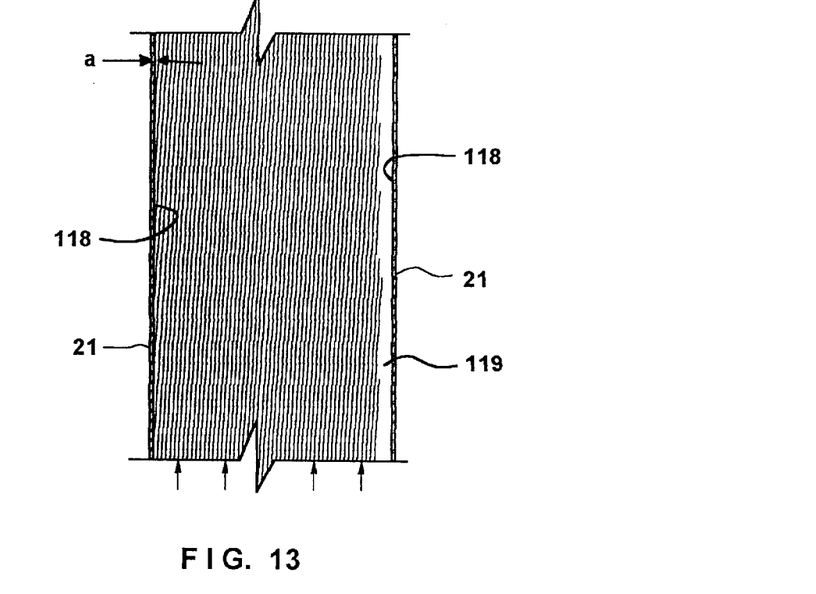
FIG. 13 is a partial detailed view of the unfolded teeth in the particle separator.

The construction of teeth 106, 108, and 110 within separator 34 can have a cyclonic shape that is coincident with the walls 118 of helical augers 21 and parallel to the flowstream. Alternatively, teeth 106, 108, and 110 may be constructed to have a slant in the flow direction. FIG. 13 shows an unfolded view of the teeth of substrates 100, 102, and 104 which are bounded by the walls 118 of helical augers 21 on each side. The angle, shown as "a", between the teeth and the auger wall may be varied but is typically between 1 and 3 degrees in the preferred embodiment. The angled construction of the teeth has the benefit of assisting in the sideways migration of particles which have been trapped. Particles trapped between the teeth will migrate towards the right side in FIG. 13. This slanted arrangement assists in the process of continuous cleaning, and renders the principal of progressive separation more effective as the particle loading of the teeth (106, 108, and 110) is continuously discharged to a downstream side channel 119. As particle loading decreases, the performance of the teeth in trapping particles improves, and the degree of cleanliness in the flow increases.

Figure 11:
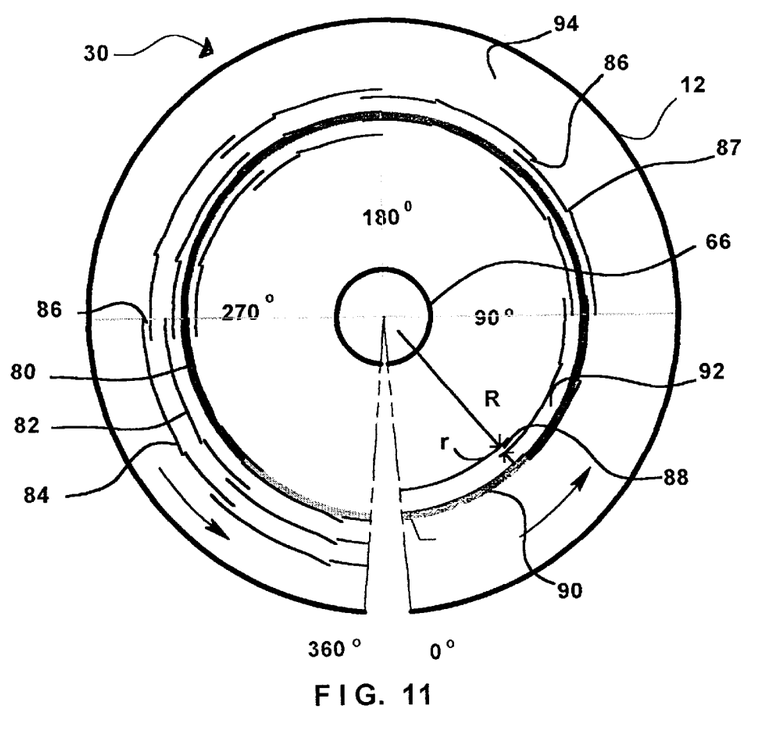
FIG. 11 is a schematic side view section of an alternate embodiment of the particulate separator having louvers with windows which is made in accordance with the teachings of the present invention.

FIG. 11, shows a second preferred embodiment of particle separators 32 or 34. The description that follows will refer to high-efficiency separator 32' for simplicity but it would be understood by one skilled in the art that the teachings of the second preferred embodiment can be utilized with equal result in the medium-efficiency separator 34.

As shown, separator 32' preferably consists of two or three concentric louvers 80, 82, and 84, which are spaced from and wrapped around the core 66. The louvers 80, 82, and 84, are segmented and provide windows 86 between the segments allowing for flow between the louvers. When a window 86 is introduced into the flow, the radius of curvature, R, of the louver is increased by an amount equal to the radial gap 88 which is shown as "r". The reason for introducing the windows 86 is that a stream layer 90 adjacent to the outside surface of any one of the louvers (80, 82, or 84) experiences the greatest level of particle separation. This is primarily due to higher laminarization of flow in close proximity to each louver, and the fact that particles in stream layer 90 can be effectively collected through electrostatic charging. In the preferred embodiment, louvers 80 and 84 are positively charged, while louver 82 is negatively charged. As stream layer 90 helically moves in the downstream direction, stream layer 90 becomes progressively cleaner because of the removal of particles.

As the particles are forced radially outward and the cleaner fluid is left on the radially inner portion of stream layer 90 a window 86 is introduced. Window 86 separates the radially inner layer of clean fluid from the radially outer particle filled layers. Little or no turbulence is created during the separation process, and the clean layer is introduced to the next inner layer below the louver. The windows are generally aligned such that the introduction of the clean layer of fluid from an entrance window is located at the same position where the next inner layer leaves the exit window, with the net effect being that velocities in the channel 92 between adjacent louvers (i.e. 80 and 82, or 82 and 84) are maintained undisturbed and unchanged. Therefore, where the separation of layers takes place, it is at flow stream lines. The size of the window 86, r, represented by radial gap 88, is usually selected to be a ratio of the channel size between the louvers, say 1:3 to 1:5. For example, if the ratio is 1:3, the layer of fluid captured in an entrance window will travel to the third window before it exits the gap of the next inner louver.

As the flow stream travels within a channel 92, the combined effect of the centrifugal separation and electrostatic charging will render the fluid cleaner by separating out more particles from the flow stream. Although distinct separation of the flow streams bounded by two louvers is not physical, physical separation takes place once the flow stream crosses a window 86.

For the flow stream shown in FIG. 11, physical separation takes place at 180° and 320°. As the fluid continues to travel within the channels 92, higher degrees of particle separation are accomplished. This effect is referred to as "progressive physical separation". Particle separation efficiencies of 99.9% can be accomplished through progressive physical separation through three turns at moderate pressure drops.

Figure 18:
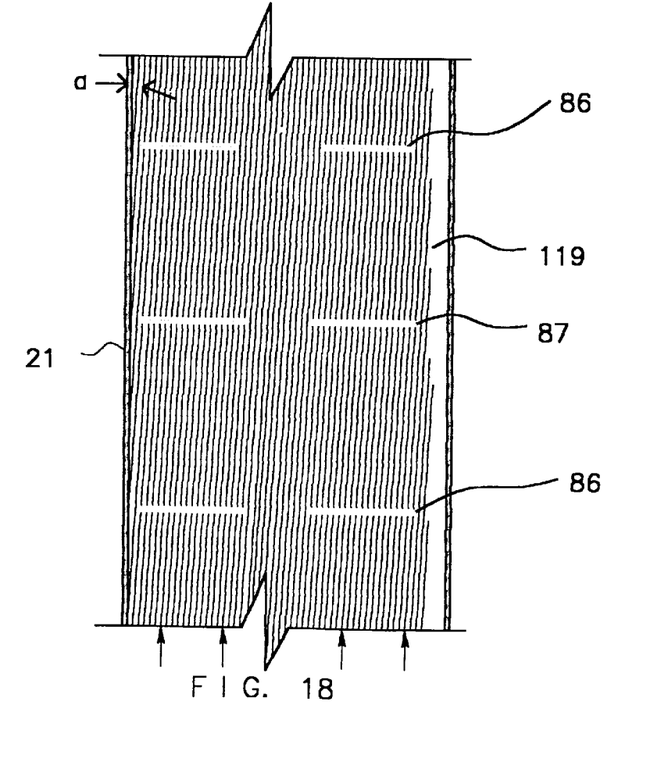
FIG. 18 is a partial detailed view of unfolded teeth of an alternate embodiment of the particle separator having louvers with windows.

As particles are collected on the surfaces of louvers 80, 82, and 84, clean fluid layers emerge at the innermost louver 80 and continue to grow. At the downstream end 25 of the separator 32' the clean fluid will emerge as the dominant flow, typically carrying 90% to 95% of the incoming flow. Particles collected on the surfaces of louvers 80, 82, and 84 are swept by the flow stream and migrate radially outwardly to flow channel 94. This can be accomplished by using one of several alternate configurations. First, short slanted teeth may be incorporated on the louvers as shown in FIG. 18. Alternately, an intermediate window 87 can be located between two windows as shown in FIG. 11. The intermediate window 87 allows a small stream of fluid to reenter the next radially outer channel 92. Each louver segment 89 incorporates an intermediate window 87. As a result, any particles which have agglomerated or coagulated on the radially inner surface 91 or the radially outer surface 93 of the louver segment 89 will migrate along the surface, 91 or 93, until they reach the tip of the intermediate window 87 where the particles are released into the flow stream. Since the agglomerated or coagulated particles which are released are generally larger in size than the particles suspended in the flow stream, the radial migration velocity is higher than that of the smaller sized particles. The distance between the intermediate window 87 and the next entrance window 86 in the flow direction is designed to ensure that agglomerated particles will have migrated radially a distance greater than the radial gap 88. The agglomerated particles will continue their radial migration through the intermediate windows 87 toward the outer periphery of housing 12 and into flow channel 94. The flow stream in a louvered separator, such as the present embodiment, tends to remain unchanged in the radial direction. The louvers progressively step radially outward, thereby encouraging the particles, and agglomerated or coagulated particles to continuously migrate in an outward radial direction.

Figure 17:
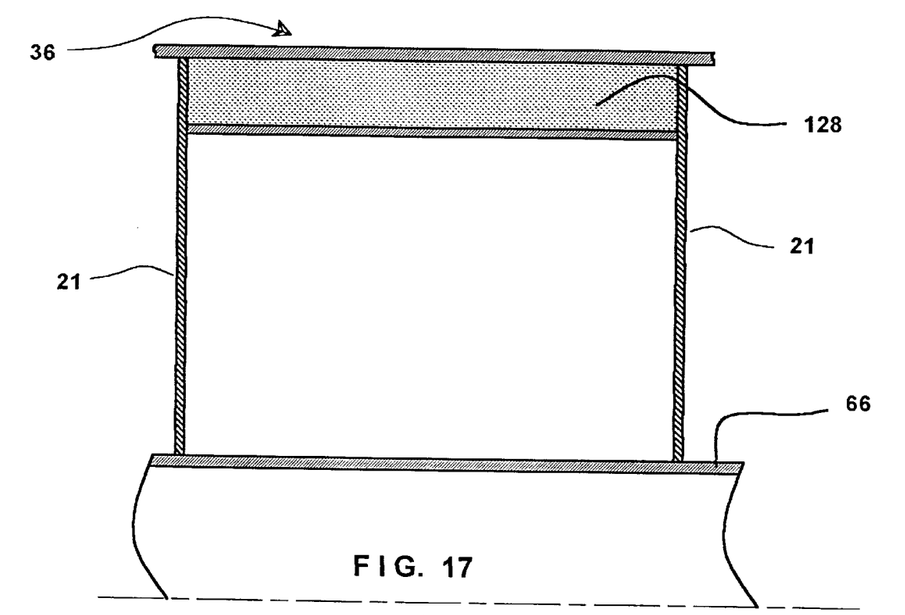
FIG. 17 shows a partial cross-sectional view of the final separation mechanism for the alternate embodiment of the particle separator shown in FIG. 11.

The fluid flow remaining in the radially outer flow channel 94 carries the particles which have been separated from the stream layer 90 as well as coarse particles separated by centrifugal action. These particles emerge at the scavenger plenum 128' of final separator 36' (shown in FIG. 17) and are discarded as scavenger flow, as will be described below. It should be noted that separator 32', having louvers equipped with windows, demonstrated particle separation efficiency close to 98% at 0.5 microns during testing.

The presence of concentric louvers 80, 82, and 84 with windows 86 also provides a precleaner type function. This is due to the fact that where only a few cyclonic rotations are implemented for separator 32', a sizable channel 94 exists between the radially outer most louver 84 and housing 12. This allows for maximization of centrifugal separation as 4 to 8 cyclonic turns are used simultaneously for precleaning and progressive physical separation.

Figure 14:
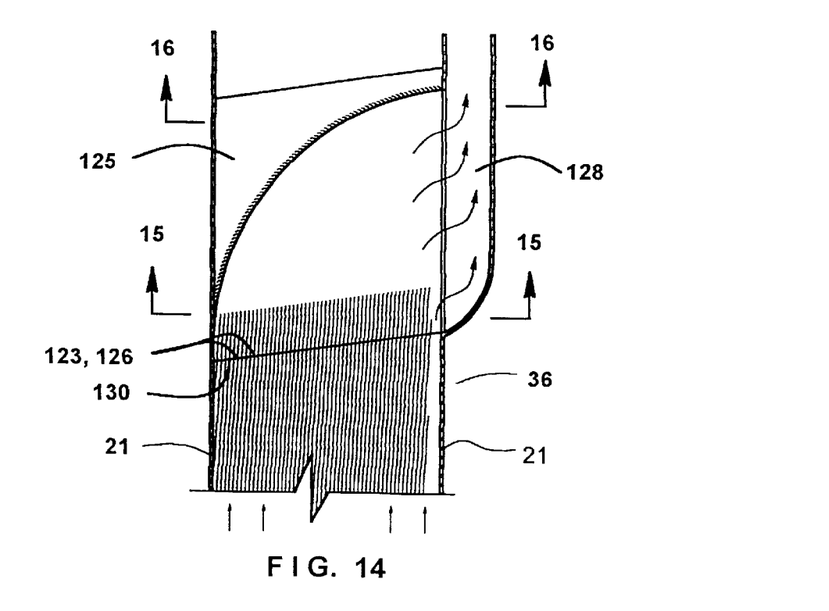
FIG. 14 is an unfolded view of the final separation mechanism of the preferred embodiment.
Figure 15:
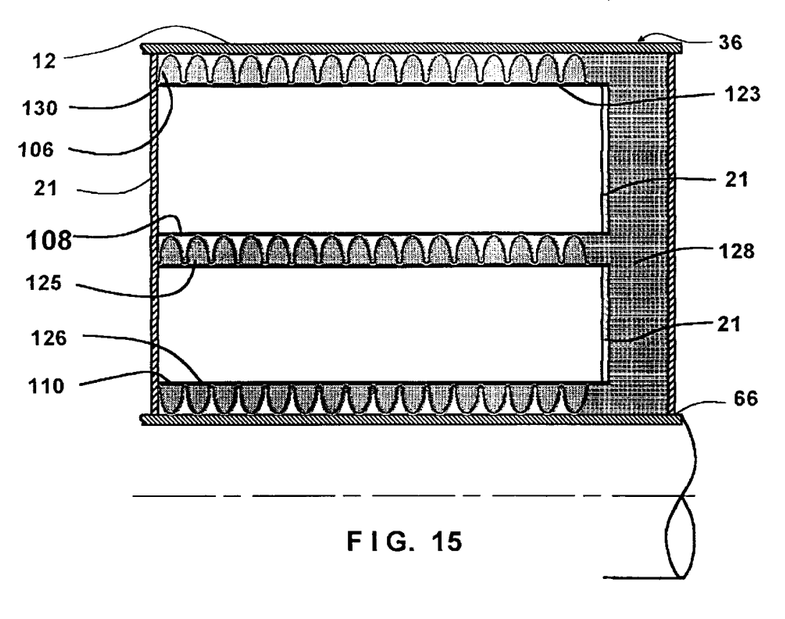
FIG. 15 shows a partial cross-sectional view of the final separation mechanism taken along line 15—15 in FIG. 14.
Figure 16:
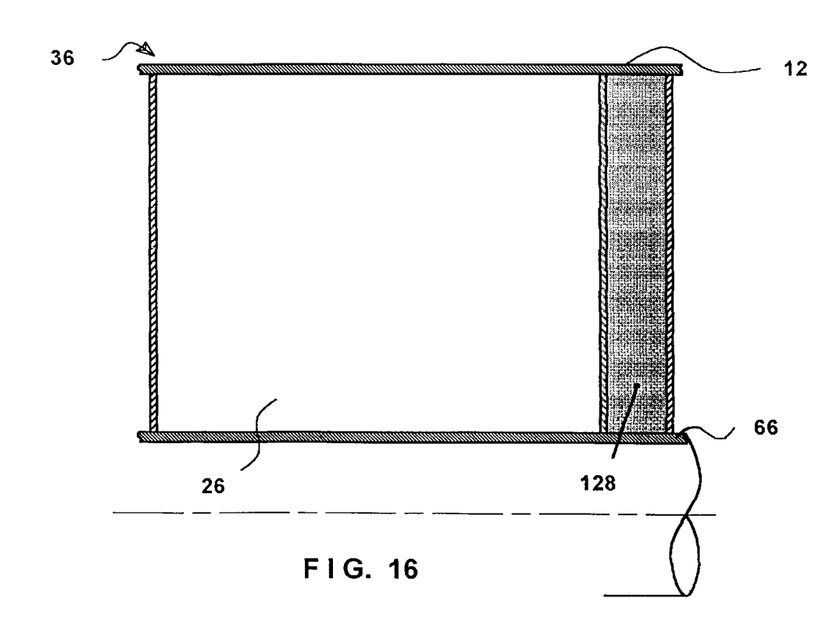
FIG. 16 shows a partial cross-sectional view of the final separation mechanism taken along line 16—16 in FIG. 14.

FIGS. 14, 15, and 16, illustrate the final stage of the continuous air cleaner 10, the final particle separator 36.

Once the level of particle separation and size in region E—E of separator 34 reaches the desired level, physical separators are introduced to separate the scavenger flow in regions D—D and F—F from the clean air in region E—E.

FIG. 14 illustrates an unfolded view of the physical separators 124 and 125 and the diversion of the scavenger flow away from the clean air flow. FIG. 15 is a cross sectional view illustrating the position of the physical separators 123, 124, 125, and 126 and the diversion of the scavenger flow to a scavenger plenum 128. In selecting a physical separators 123, 124, 125, or 126 emphasis is placed on minimizing the local turbulence introduced by the separator plate 127 in the flow direction. Two design features are particularly important in constructing separator plate 127. First the thickness of the separator plate 127 at upstream tip 130 where flow first enters the separator is between 0.001 and 0.003" for a downstream distance of approximately 0.5". The thickness of plate 127 is then increased to 0.020–0.030" to provide added structural strength. Secondly, upstream tip 130 of separator plate 127 is spaced slightly away from the teeth 106, 108, and 110. This will ensure that any particles within region E—E and in close proximity to region F—F are captured through the particles' inertial effect. It is known that particles of sufficient size and inertia can be separated from flow stream lines through the effect of mass inertia, a related principle in aerosol science is known as non-isokenetic conditions.

FIG. 16 is a cross sectional view downstream from that of FIG. 15. FIG. 16 shows that after the scavenger flow has been directed towards the scavenger plenum 128 the separators function is accomplished and they are terminated. The clean air and dirty air are physically and completely separated from one another. The clean air exits clean air duct 26 at clean air outlet 16, while the dirty air within scavenger plenum 128 exits dirty air duct 22 at outlet 18.

SYSTEM OPERATION

Referring again to FIG. 3, particulate-laden air is introduced through the first stage of the device which functions as a precleaner. Large-size particles are separated through this stage toward the outer periphery of the housing, passing through slotted openings in the perforated shell, along with little or no scavenger air flow as previously described. The precleaner design allows for an efficient particle separation due to centrifugal action as well as partial agglomeration of some small size particles on the auger-like louvers.

Once the large size particles are removed from the air stream, an agglomerator is employed. Depending upon the nature and characteristics of the particles (such as wet or dry, or if a large portion of particles are in the submicron range), a wire mesh agglomerator may be employed. The selection and design of the wire mesh agglomerator is such that small size particles are collected on the wire mesh fibers thereby forming dendrites. Collection mechanisms can be enhanced through electrification of the wire mesh using a high-voltage power supply as previously described. As the dendrites continue to build up around the fiber, their obstruction areas, and consequently the aerodynamic drag forces, increase until a threshold is reached between the drag forces and adhesion forces. Dendrites will break off the wire mesh and are usually of a relatively large size compared to the particles which they are made of. The separation of larger size particles and dendrites (which act as larger particles) can be easily accomplished in the next stage of the device.

Particles entering the high-efficiency particle separator experience high centrifugal acceleration in region B—B. As a result of the high acceleration, the particles are separated to the boundary line between region B—B and region A—A. Once the particles enter region A—A, the flow velocity, and consequently turbulence, are significantly reduced due to the increased viscous boundary areas. These particles are either collected on the walls of the teeth within region A—A, or are trapped and remain suspended between the teeth spacings in region A—A. Again, electrostatic charging is employed to enhance particle collection on the walls. Particle migration through centrifugal action corresponds to the height of region B—B. By increasing the height of the teeth in region A—A, the height of region B—B is decreased, resulting in an accelerated pace of particle separation.

Particles collected on the walls of the high-efficiency separator teeth form dendrites. These dendrite will continue to grow until a threshold is reached between aerodynamic drag forces and adhesion forces, at which point the dendrites will migrate in the same direction as the flow stream, and may migrate in a slightly radial direction if their speed in the flow direction becomes appreciable. The flow velocity between the separator teeth is selected to be low in value to enhance collection and entrapment. However, the flow velocity is sufficiently high to ensure against plugging up of the teeth flow area. This condition is of least concern for dry particles, but requires careful design when dealing with wet particles.

As air in region B—B becomes cleaner, the depth of the particle separator teeth can be decreased thereby allowing for more flow area in region B—B. This is done in the medium-efficiency particle separator where region B—B expands to region E—E. The decrease in teeth heigh allows for a reduction in the pressure drop along the separator. The change in the teeth height from the high-efficiency to medium-efficiency separator can be accomplished gradually or in step increments. The medium-efficiency particle separator will continue the task of particle separation, but at lower pressure drop.

Particles separated through centrifugal action and electrostatic charging are dominantly collected in region A—A and later region D—D. However, it was observed in prototype testing that particles are also collected on the teeth surface in regions C—C and F—F, primarily due to electrostatic charging. The teeth height in region C—C is short relative to those in A—A to limit particle collection in this region to a minimum and to limit the pressure drop. The same is true of the teeth height in region F—F relative to the teeth in region D—D.

At the downstream end 25 of the cleaner, physical separators are introduced between regions D—D and E—E, and regions E—E and F—F. All air contained in regions D—D and F—F is removed to a separate scavenger plenum as scavenger flow. Due to the lower flow velocity in regions D—D and F—F, the scavenger flow ratio as a percentage of the total flow is typically less than 10%. In the preferred embodiment the scavenger flow is usually in the 3 to 4 percent range. Air remaining in region E—E is considered to be clean and can be used for the intended application.

The foregoing discussion discloses and describes a preferred embodiment of the present invention. One skilled in the art will readily recognize from such discussion, and from the accompanying drawings and claims, that various changes, modifications, and variations can be made therein without departing from the true spirit and fair scope of the invention as defined in the following claims.

What is claimed is:

1. A particle separator for separating particles from a particulate contaminated fluid stream, said separator comprising:

a housing;

a radially centered core;

helical augers extending from said core to said housing such that the fluid stream enters said separator at an upstream end, is forced into a helical flow direction, and exits at a downstream end;

two or more louvers extending between said helical augers, at least one of said louvers being radially spaced from said core such that a flow channel is formed therebetween, said louvers being formed in a comb-like manner such that a plurality of teeth are formed thereon;

wherein the particles of the particulate contaminated fluid stream are separated from the fluid stream by centrifugal forces and are collected within a teeth spacing flow area between said teeth of said louvers.

2. The particle separator of claim 1 wherein said louvers are electrostatically charged such that adjacent louvers have alternate polarity, said electrostatic charging providing additional forces for separating the particles from the fluid stream, the separated particles being attracted to and collected on the surface of said louvers.

3. The particle separator of claim 1 wherein said teeth on any one of said louvers are shorter near said downstream end of said separator than near said upstream end of said separator.

4. The particle separator of claim 3 wherein said teeth are gradually shortened as said louvers extend from said upstream end of said separator toward said downstream end of said separator.

5. The particle separator of claim 3 wherein said teeth are incrementally shortened between said upstream end of said separator and said downstream end of said separator.

6. The particle separator of claim 1 wherein said teeth are provided at an angle relative to said helical augers such that the collected particles migrate in a sideways direction to a side channel thereby continually cleaning said teeth.

7. The particle separator of claim 1 further comprising a physical separator which physically separates and diverts the particles collected in said teeth spacing flow area from the fluid stream, wherein the particles diverted by said physical separator are directed to a plenum which is in communication with a duct having an outlet for discharge of the particles.

8. A particle separator for separating particles from a particulate contaminated fluid stream, said separator comprising:

a housing;

a radially centered core;

helical augers extending from said core to said housing such that the fluid stream enters said separator at an upstream end, is forced into a helical flow direction, and exits at a downstream end;

two or more louvers extending between said helical augers which are concentrically spaced from said core, said louvers being segmented and having a radial gap between said segments, said radial gap forming a window;

wherein the particles of the particulate contaminated fluid stream are separated from the fluid stream by centrifugal forces which urge the particles to migrate in a radially outward direction, a radially inner portion of the flow stream entering said window and being separated from the radially outward urged particles.

9. The particle separator of claim 8 wherein said segments of said louvers further provide an intermediate window such that particles which have collected on a radially inner surface and a radially outer surface of the said louvers are released into the fluid stream, thereby migrating in a radially outward direction due to centrifugal forces.

10. The particle separator of claim 8 wherein said louvers have a plurality of teeth thereon, said teeth being slanted at an angle relative to said helical augers such that the collected particles migrate in a sideways direction to a side channel thereby continually cleaning said teeth.

11. The particle separator of claim 8 further comprising a physical separator which physically separates and diverts the particles collected in a radially outer flow channel from the fluid stream, wherein the particles diverted by said physical separator are directed to a plenum which is in communication with a duct having an outlet for discharge of the particles.

12. The particle separator of claim 8 wherein said louvers are electrostatically charged such that adjacent louvers have alternate polarity, said electrostatic charging providing additional forces for separating the particles from the fluid stream, the separated particles being attracted to and collected on the surface of said louvers.

13. The particle separator of claim 12 further comprising a physical separator which physically separates and diverts the particles collected in a radially outer flow channel from the fluid stream, wherein the particles diverted by said physical separator are directed to a plenum which is in communication with a duct having an outlet for discharge of the particles.

14. The particle separator of claim 12 wherein said segments of said louvers further provide an intermediate window such that particles which have collected on a radially inner surface and a radially outer surface of the said louvers are released into the fluid stream, thereby migrating in a radially outward direction due to centrifugal forces.

15. A continuous fluid cleaner for separating and removing particles from a particulate contaminated fluid stream, said cleaner comprising:

a housing having an inlet providing a fluid flow through said cleaner, a clean fluid outlet, and an outlet for the removal of the particles which have been separated and collected;

means for urging said fluid flow in a generally helical flow pattern within said housing as said fluid flow progresses from an upstream end of said cleaner to a downstream end of said cleaner;

means contained within said housing for progressively separating particles from said fluid flow, said progressive separating means having a core radially centered within said housing, helical augers extending from said core to said housing, two or more louvers extending between said helical augers, at least one of said louvers being radially spaced from said core such that a flow channel is formed therebetween, said louvers being formed in a comb-like manner such that a plurality of teeth are formed thereon; and means for physically separating and removing said separated particles from said fluid flow wherein the particles of the particulate contaminated fluid stream are separated from the fluid stream by centrifugal forces and are collected within a teeth spacing flow area between said teeth of said louvers thereby creating a cleaner fluid flow which is discharged from said clean fluid outlet.

16. The cleaner of claim 15 wherein said progressive separating means further comprises:

a precleaner having a plurality of augers generally perpendicular to and attached to a core which is radially centered within said housing;

said housing having a perforated shell portion providing apertures therein which allow particles separated from the fluid flow to pass therethrough as centrifugal forces urge the particles in a radially outward direction.

17. The cleaner of claim 16 wherein said plurality of augers are generally straight augers.

18. The cleaner of claim 16 wherein said plurality of augers are generally wavering augers.

19. The cleaner of claim 16 wherein an outside shell surrounds said perforated shell portion of said housing such that the particles separated from the fluid flow and which pass through said apertures is collected and discharged in a controlled manner.

20. The cleaner of claim 15 wherein said progressive separating means therein comprises an agglomerator having wire mesh therein such that relatively small particles within said fluid flow collect on and agglomerate with other particles collected on said wire mesh thereby forming dendrites of agglomerated particles, said dendrites being released into said fluid flow when the fluid drag across the dendrite overcomes the adhesion of said dendrite to said wire mesh.

21. The cleaner of claim 20 wherein said wire mesh is electrostatically charged.

22. A continuous fluid cleaner for separating and removing particles from a particulate contaminated fluid stream, said cleaner comprising:

a housing having an inlet providing a fluid flow through said cleaner, a clean fluid outlet, and an outlet for the removal of the particles which have been separated and collected;

a core radially centered within said housing;

means for urging said fluid flow in a generally helical flow pattern within said housing as said fluid flow progresses from an upstream end of said cleaner to a downstream end of said cleaner;

a precleaner having a plurality of augers generally perpendicular to and attached to said core, said housing having a perforated shell portion coincident with said precleaner and providing apertures therein which allow particles separated from the fluid flow to pass therethrough as centrifugal forces urge the particles in a radially outward direction;

an agglomerator having a wire mesh therein such that relatively small particles within said fluid flow collect on and agglomerate with other particles collected on said wire mesh thereby forming dendrites of agglomerated particles, said dendrites being released into said fluid flow when the fluid drag across the dendrite overcomes the adhesion of said dendrite to said wire mesh;

a separator having two or more louvers extending between said helical augers, at least one of said louvers being radially spaced from said core such that a flow channel is formed therebetween, said louvers being formed in a comb-like manner such that a plurality of teeth are formed thereon, whereby the particles of the particulate contaminated fluid stream are separated from the fluid stream by centrifugal forces and are collected within a teeth spacing flow area between said teeth of said louvers;

means for physically separating and removing said separated particles from said fluid flow thereby creating a cleaner fluid flow which is discharged from said clean fluid outlet.

23. A continuous fluid cleaner for separating and removing particles from a particulate contaminated fluid stream, said cleaner comprising:

a housing having an inlet providing a fluid flow through said cleaner, a clean fluid outlet, and an outlet for the removal of the particles which have been separated and collected;

a core radially centered within said housing;

means for urging said fluid flow in a generally helical flow pattern within said housing as said fluid flow progresses from an upstream end of said cleaner to a downstream end of said cleaner;

a precleaner having a plurality of augers generally perpendicular to and attached to said core, said housing having a perforated shell portion coincident with said precleaner and providing apertures therein which allow particles separated from the fluid flow to pass therethrough as centrifugal forces urge the particles in a radially outward direction;

an agglomerator having a wire mesh therein such that relatively small particles within said fluid flow collect on and agglomerate with other particles collected on said wire mesh thereby forming dendrites of agglomerated particles, said dendrites being released into said fluid flow when the fluid drag across the dendrite overcomes the adhesion of said dendrite to said wire mesh;

a separator having two or more louvers extending between said helical augers and which are concentrically spaced from said core, said louvers being segmented and having a radial gap between said segments, said radial gap forming a window such that the particles of the particulate contaminated fluid stream are separated from the fluid stream by centrifugal forces which urge the particles in a radially outward direction, a radially inner portion of the flow stream entering said window and being separated from the radially outward urged particles means for physically separating and removing said separated particles from said fluid flow thereby creating a cleaner fluid flow which is discharged from said clean fluid outlet.

24. A continuous fluid cleaner for separating and removing particles from a particulate contaminated fluid stream, said cleaner comprising:

a housing having an inlet providing a fluid flow through said cleaner, a clean fluid outlet, and an outlet for the removal of the particles which have been separated and collected;

means for urging said fluid flow in a generally helical flow pattern within said housing as said fluid flow progresses from an upstream end of said cleaner to a downstream end of said cleaner;

means contained within said housing for progressively separating particles from said fluid flow said progressive separating means having a core radially centered within said housing, helical augers extending from said core to said housing, two or more louvers extending between said helical augers which are concentrically spaced from said core, said louvers being segmented and having a radial gap between said segments, said radial gap forming a window; and means for physically separating and removing said separated particles from said fluid flow wherein the particles of the particulate contaminated fluid stream are separated from the fluid stream by centrifugal forces which urge the particles in a radially outward direction, a radially inner portion of the flow stream entering said window and being separated from the radially outward urged particles thereby creating a cleaner fluid flow which is discharged from said clean fluid outlet.

25. The cleaner of claim 24 wherein said progressive separating means further comprises:

a precleaner having a plurality of augers generally perpendicular to and attached to a core which is radially centered within said housing;

said housing having a perforated shell portion providing apertures therein which allow particles separated from the fluid flow to pass therethrough as centrifugal forces urge the particles in a radially outward direction.

26. The cleaner of claim 25 wherein said plurality of augers are generally straight augers.

27. The cleaner of claim 25 wherein said plurality of augers are generally wavering augers.

28. The cleaner of claim 25 wherein an outside shell surrounds said perforated shell portion of said housing such that the particles separated from the fluid flow and which pass through said apertures is collected and discharged in a controlled manner.

29. The cleaner of claim 24 wherein said progressive separating means further comprises an agglomerator having wire mesh therein such that relatively small particles within said fluid flow collect on and agglomerate with other particles collected on said wire mesh thereby forming dendrites of agglomerated particles, said dendrites being released into said fluid flow when the fluid drag across the dendrite overcomes the adhesion of said dendrite to said wire mesh.

30. The cleaner of claim 29 wherein said wire mesh is electrostatically charged.

\* \* \* \* \*

UNITED STATES PATENT AND TRADEMARK OFFICE
CERTIFICATE OF CORRECTION

PATENT NO. : 5,972,215
DATED : October 26, 1999
INVENTOR(S) : Kammel, Rafaat A.

It is certified that error appears in the above-identified patent and that said Letters Patent is hereby corrected as shown below:

Column 15, Claim 20, Line 14; after "means" delete "therein" and insert -- further--

Signed and Sealed this

Sixteenth Day of May, 2000

Attest:

Q. TODD DICKINSON

Attesting Officer    Director of Patents and Trademarks